(12) United States Patent
Gao et al.

(10) Patent No.: US 11,643,898 B2
(45) Date of Patent: May 9, 2023

(54) SYSTEMS AND METHODS FOR MONITORING AND/OR PREDICTING SAGGING TENDENCIES OF FLUIDS

(71) Applicant: M-I L.L.C., Houston, TX (US)

(72) Inventors: Yan Gao, Sugar Land, TX (US); Yiyan Chen, Sugar Land, TX (US); Reda Karoum, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 16/656,491

(22) Filed: Oct. 17, 2019

(65) Prior Publication Data
US 2020/0124513 A1    Apr. 23, 2020

Related U.S. Application Data

(60) Provisional application No. 62/747,123, filed on Oct. 17, 2018.

(51) Int. Cl.
*E21B 31/03* (2006.01)
*E21B 21/06* (2006.01)
(Continued)

(52) U.S. Cl.
CPC .......... *E21B 31/035* (2020.05); *E21B 21/062* (2013.01); *E21B 31/03* (2013.01); *E21B 47/00* (2013.01); *G01N 11/02* (2013.01)

(58) Field of Classification Search
CPC ...... E21B 31/03; E21B 31/035; E21B 21/062; G01N 11/02
See application file for complete search history.

(56) References Cited

U.S. PATENT DOCUMENTS 4,086,061 A    4/1978 Hoffa et al.
4,273,650 A    6/1981 Solomon
(Continued)

FOREIGN PATENT DOCUMENTS

CN    2783315 Y    5/2006
CN    101842679 A    9/2010
(Continued)

OTHER PUBLICATIONS

Saasen, et al., Prediction of Barite Sag Potential of Drilling Fluids from Rheological Measurements, Society of Petroleum Engineers, SPE/IADC Drilling Conference held in Amsterdam, Feb. 28-Mar. 2, 1995.

(Continued)

*Primary Examiner* — D. Andrews
(74) *Attorney, Agent, or Firm* — Jeffrey D. Frantz

(57) ABSTRACT

Systems and methods measure one or more rheological properties and/or parameters of a fluid and establish at least one correlation between the measured one or more rheological properties and/or parameters. The systems and methods may correlate the measured one or more rheological properties and/or parameters to static aging results to establish the at least one correlation between the one or more rheological properties and/or parameters of the fluid. The systems and methods may predict at least one sagging tendency of the fluid based on the established at least one correlation and may measure and/or monitor static sagging of the fluid based on the predicted at least one sagging tendency of the fluid. The systems and methods may guide fluid treatment of the fluid or produce a mud system based on the predicted at least one sagging tendency of the fluid.

6 Claims, 13 Drawing Sheets

(51) Int. Cl.
*E21B 31/00* (2006.01)
*E21B 47/00* (2012.01)
*G01N 11/02* (2006.01)

(56) References Cited

U.S. PATENT DOCUMENTS

| | | | |
|---|---|---|---|
| 5,780,737 | A | 7/1998 | Wible et al. |
| 6,240,770 | B1 | 6/2001 | Raffer |
| 6,257,354 | B1 | 7/2001 | Schrader et al. |
| 6,330,826 | B1 | 12/2001 | Meeten |
| 6,584,833 | B1 | 7/2003 | Jamison et al. |
| 6,931,916 | B2 | 8/2005 | Zamora et al. |
| 8,387,442 | B2 | 3/2013 | Jamison et al. |
| 8,784,745 | B2 | 7/2014 | Nelson et al. |
| 8,881,577 | B1 | 11/2014 | Agar et al. |
| 9,134,291 | B2 | 9/2015 | Jamison et al. |
| 9,194,972 | B2 | 11/2015 | Van Der Zwaag et al. |
| 9,222,351 | B2 | 12/2015 | Jamison |
| 9,428,976 | B2 | 8/2016 | Porter et al. |
| 9,513,203 | B2 | 12/2016 | Kulkarni et al. |
| 9,777,542 | B2 | 10/2017 | Stock et al. |
| 2003/0084708 | A1 | 5/2003 | Abnett |
| 2003/0233867 | A1 | 12/2003 | Hall |
| 2006/0175547 | A1 | 8/2006 | DiFoggio et al. |
| 2006/0243047 | A1 | 11/2006 | Terabayashi et al. |
| 2008/0066537 | A1 | 3/2008 | Hegeman et al. |
| 2010/0304418 | A1 | 12/2010 | Moussavi et al. |
| 2012/0094876 | A1 | 4/2012 | Jamison et al. |
| 2013/0009784 | A1 | 1/2013 | Villard et al. |
| 2013/0277113 | A1 | 10/2013 | Murphy |
| 2014/0105446 | A1 | 4/2014 | Maxey et al. |
| 2014/0166361 | A1 | 6/2014 | Jamison et al. |
| 2014/0202772 | A1* | 7/2014 | Kulkarni ............... E21B 21/08 175/65 |
| 2014/0319080 | A1 | 10/2014 | Kaarigstad et al. |
| 2015/0233614 | A1 | 8/2015 | Kindt et al. |
| 2015/0316527 | A1 | 11/2015 | Stock et al. |
| 2016/0040533 | A1 | 2/2016 | Harrison et al. |
| 2016/0138395 | A1* | 5/2016 | Kulkarni ............... E21B 44/00 166/250.01 |
| 2016/0265029 | A1 | 9/2016 | Ying et al. |
| 2016/0313292 | A1 | 10/2016 | Desai et al. |
| 2016/0356919 | A1 | 12/2016 | Jamison et al. |
| 2017/0038491 | A1* | 2/2017 | Gonzalez ............... G01N 11/16 |
| 2017/0198189 | A1* | 7/2017 | Panamarathupalayam ................... E21B 21/003 |
| 2018/0164201 | A1 | 6/2018 | Zimmer et al. |
| 2018/0266930 | A1 | 9/2018 | Nowak et al. |
| 2020/0182852 | A1 | 6/2020 | Stewart et al. |
| 2021/0088499 | A1 | 3/2021 | Stewart et al. |

FOREIGN PATENT DOCUMENTS

| | | |
|---|---|---|
| CN | 102187199 A | 9/2011 |
| CN | 203025064 U | 6/2013 |
| CN | 106415236 A | 2/2017 |
| GB | 1379470 A | 1/1975 |
| GB | 2344180 A | 5/2000 |
| JP | H1078824 A | 3/1998 |
| JP | 2007086035 A | 4/2007 |
| KR | 20110075086 A | 7/2011 |
| WO | 0167068 A2 | 9/2001 |
| WO | 2009079059 A1 | 6/2009 |
| WO | 2011100435 A2 | 8/2011 |

OTHER PUBLICATIONS

International Search Report and Written Opinion issued in International Patent Application No. PCT/US2020/045183 dated Nov. 24, 2020, 13 pages.
International Preliminary Report on Patentabilityissued in International Patent Application No. PCT/US2020/045183 dated Apr. 7, 2022, 10 pages.
Search Report and Written Opinion of International Patent Application No. PCT/US2018/040769 dated Oct. 25, 2018, 7 pages.
International Preliminary Report on Patentability issued in Intentional Patent Application No. PCT/US2018/040769 dated Jan. 7, 2020, 5 pages.
Search and Examination report issued in European Patent Application 18827666.1 dated Feb. 11, 2021, 14 pages.
Garma Electronica s.l., Advantages of Thermal Dispersion Level Switch, Retrieved from the internet: URL: https://www.https://www.garmasl.com/en/blog/82-advantages-of-thermal-dispersion-level-switch, Published Nov. 3, 2016, retrieved on Feb. 1, 2021, 2 pages.
Office Action issued in U.S. Appl. No. 16/578,570 dated Oct. 4, 2021, 18 pages.
API 13B-1 Standard, "Recommended Practice for Field Testing Water-based Drilling Fluids," Fourth Edition, Mar. 2009, Errata 1, Aug. 2014, 104 pages.
API 13B-2 Standard, "Recommended Practice for Field Testing Oil-based Drilling Fluids," Fifth Edition, Apr. 2014, Errata 1, Aug. 2014, 154 pages.
Fann Instrument Company, Model 35 Viscometer Instruction Manual, Houston, Texas, 2016, 45 pages.
English Translation of JP-H1078824-A (Year: 1998).
Office Action issued in U.S. Appl. No. 16/623,383 dated Dec. 27, 2021, 17 pages.
Search Report and Writen Opinion of Russian Patent Application No. 2020104983 dated Jan. 21, 2022, 16 pages with English translation.
Exam Report issued in India Patent Application No. 202017001853 dated Feb. 28, 2022, 5 pages.
First Office Action issued in Chinese Patent Application No. 2018800443773 dated Apr. 26, 2022, 26 pages with English translation.
Office Action issued in U.S. Appl. No. 16/578,570 dated May 13, 2022, 18 pages.
Preliminary Office Action issued in Brazil Patent Application No. BR112019028218-1 dated Aug. 4, 2022, 6 pages with English translation.
Nagy, M. J et al., "The Effect of Pulse Width Modulation (PWM) Frequency on the Reliability of Thermoelectric Modules", IEEE presented at the 18th International Conference on Thermoelectrics, Piscataway, New Jersey, U.S.A., 1999, pp. 123-125.
Communication Pursuant to Article 94(3) issued in European Patent Application No. 18827666.1 dated Aug. 22, 2022, 9 pages.
Notice of Allowance issued in U.S. Appl. No. 16/578,570 dated Sep. 7, 2022, 10 pages.
Decision on Grant issued in Russian Patent Application No. 2020104983 dated Sep. 22, 2022, 19 pages with English translation.
Office Action issued in Colombia Patent Application NC2020/0001163 dated Sep. 26, 2022, 28 pages with English translation.
Exam Report issued in Kuwait Patent Application No. KW/P/2019/433 dated May 16, 2022,4 pages.
Second Office Action issued in Chinese Patent Application No. 2018800443773 dated Jan. 5, 2023, 25 pages with English translation.
Notice of Allowance issued in U.S. Appl. No. 16/587,570 dated Jan. 11, 2023, 13 pages.

* cited by examiner

SYSTEMS AND METHODS FOR MONITORING AND/OR PREDICTING SAGGING TENDENCIES OF FLUIDS

CROSS REFERENCE TO RELATED APPLICATIONS

This application claims the benefit of U.S. Provisional Application No. 62/747,123 filed Oct. 17, 2018, the content of which is incorporated herein by reference in its entirety.

BACKGROUND

Currently, the fluid design of drilling mud or fluid formulations is based on trial and error and one of the most time-consuming steps is often the static sagging test that may require a mud sample to be loaded into a HPHT aging cell for 7 days or more. After 7 days, the 25% volume of the bottom density is measured and compared to the initial bulk density of the drilling fluid. This known method is also relatively crude in term of repeatability and accuracy (average standard deviation +/−0.25 ppg). There is traditionally no rapid screening method of static sag to select an optimal mud or fluid formulation.

During drilling operations, the mud sample may be collected from the field and sent back to the lab to do aging test to check sagging tendency. The lab test results may be neither useful to understand the occurrence of barite sag in the first place nor provide immediate instructive adjustments for the mud to mitigate the sag during the job. Often, the density of the returning drilling mud or fluid is checked periodically to detect any variations. Also, the fluctuation of standpipe pressure is monitored. Both are considered as an indirect way to dictate occurrence of sag. Sometimes, however, it is found the change in either density or pressure is not necessarily caused by sagging. So far, there is no suitable or industrial acceptable method for sag detection/prediction at rig site and the majority of the test equipment is limited to lab tests. In the past, engineers relied on viscosity at low shear rate or gel strength as an indication for barite sagging. However, more and more studies have shown that the static sagging is not well linked to rheology parameters (yield point, plastic viscosity, gel strength) as measured by conventional API methods.

Known to the art are a variety of systems and methods which characterize, analyze and/or monitor sag in drill or well fluids. For example, U.S. Pat. No. 8,387,442 is directed to systems and methods for direct and indirect measurement of the density of a fluid which exhibits sag characteristics based on monitored particle distribution of a fluid mixture as the fluid mixture changes due to gravity. Further, U.S. Pat. No. 6,584,833 is directed to an apparatus and method for analyzing well fluid sag caused by settling of weighting materials in drilling fluids or other solids bearing fluid. Still further, U.S. Pat. No. 6,330,826 is directed to an apparatus and a method for measuring the sag properties of a drilling fluid by using a conically or frusto-conically shaped inner body and an outer body having an opening with contours closely matching those of inner body. Moreover, U.S. Pat. No. 6,931,916 is directed to methods and apparatus for measuring sag properties of a drilling fluid using a rotary viscometer. Additionally, U.S. Pat. No. 9,194,972 is directed to a method of determining a physiochemical property of a drilling fluid at a drilling site during a drilling phase. However, these disclosures do not involve predicting at least one fluid sag tendency based on or utilizing one or more rheological properties and/or parameters as disclosed herein.

U.S. Pat. No. 9,222,351 is directed to a process for monitoring real-time sagging based on pressure response and correlate differential pressure to the density change using an implicit computer model. Additionally, U.S. Pat. No. 9,513,203 is directed to a method of predicting the dynamic sag rate in a drilling fluid by obtaining rheological data from a measuring device. Both above-identified disclosures are focused on dynamic sagging, and not directed to static sagging of the drilling fluid.

A paper, entitled: "Prediction of Barite Sag Potential of Drilling Fluids From Rheological Measurements", A. Saasen, et al., Society of Petroleum Engineers, SPE-29410 (1995), provides a discussion confirming poor correlation between static sag data and Fann 35 viscometry measurements, such as, for example, 3 rpm viscosity and 10 minute gel. Therein, a threshold value of G'/G" by oscillation rheology measurements is used as indicator of sagging potential. However, no quantitative correlation between viscoelastic properties and sagging was established in said discussion.

Moreover, some functions of drilling mud or fluid during well completion are to remove cuttings from the wellbore, control formation pressures, suspend and circulate cuttings and maintain wellbore stability. With an advancement of drilling technology, drilling activities are targeting development of best practices for extended reach drilling, especially for deep water drilling applications. With extended reach drilling, engineers can stretch limits of the wellbore, reduce chemical footprints, increase productivity, and make the drilling process more economically competitive. While at the same time, engineers face problems such as barite sagging due to fluid instability during long-term circulation especially in a highly deviated regime. If barite sagging occurs, the mud or fluid at top of the wellbore is much lighter than that at the bottom. During the operation, the density of the drilling mud or fluid needs to be closely maintained to control the hydrostatic pressure. If the mud is too light, formation fluids from the formation may enter the wellbore and flow uncontrolled to the surface, which may possibly cause a blowout. If the mud or fluid is too heavy, excessive mud weight can create fractures into the formation leading to fluid loss or well control problems. Additionally, fluid sagging may cause stuck pipe in the wellbore and increase difficulty in mud circulation. To formulate drilling muds or fluids with a good ability to suspend barite particles at elevated temperature to fulfill requirements of performances for extended reached, deep water wells, or HPHT wells, it may be helpful to have at least one laboratory method that may predict and/or aid or help to select the best or optimal drilling mud or fluid formulations.

Therefore, there is a need for reliable systems and methods to overcome the limitations of the above-mentioned disclosures. Moreover, there is a need for reliable systems and methods for predicting sagging propensity, avoiding error and trials and reducing product development resources and/or eliminating or reducing overtreatment of wellbore fluids at, for example, a wellsite.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

FIGS. 3A-3I illustrate statistically plotted static sags verses different rheology properties measured by a Fann 35 viscometer, according to one or more examples of the disclosure.

(FIG. 6B) static sag after 7-day aging at 200° F. verses ultra-low-shear-rate viscosity (hereinafter "ULSRV") after hot-roll, according to one or more examples of the disclosure.

DETAILED DESCRIPTION OF THE DISCLOSURE

Figure 1:
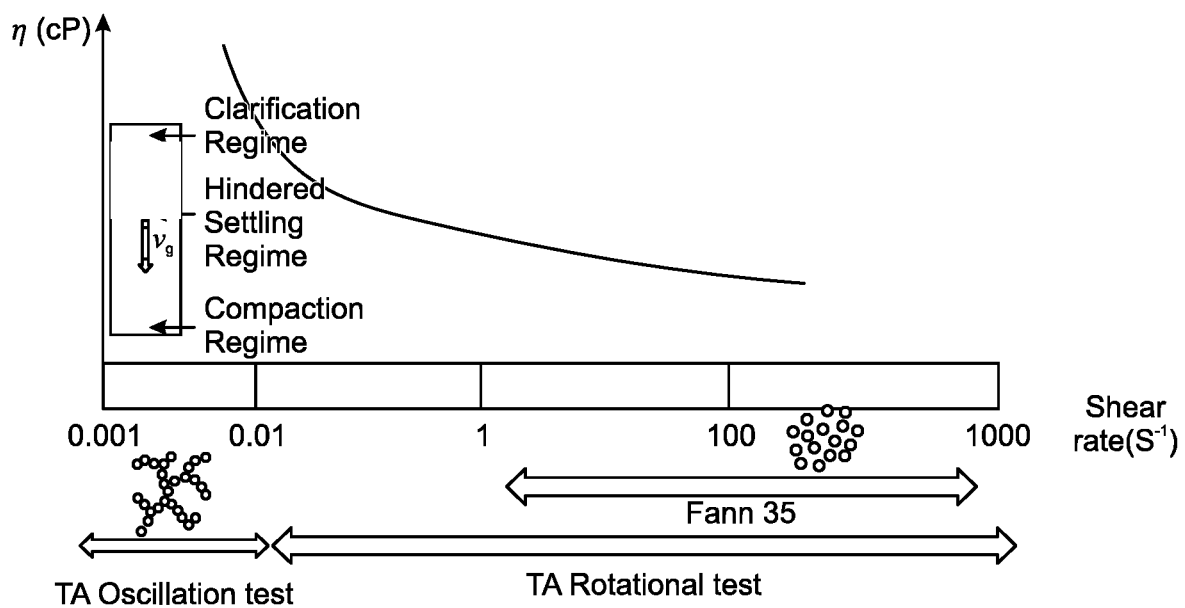
FIG. 1 illustrates a graph comparison between a TA rheometer and a Fann 35 viscometer, according to one or more examples of the disclosure.

Illustrative examples of the subject matter claimed below will now be disclosed. In the interest of clarity, not all features of an actual implementation are described in this disclosure. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

The present disclosure is generally drawn to systems, devices, apparatuses, processes and/or methods (hereinafter "present systems and methods") that monitor and/or predict one or more sagging tendencies of one or more fluids. In one or more embodiments, the present systems and methods may monitor and predict at least one sag tendency for at least one fluid, such as, a drilling fluid within a borehole or wellbore. In some embodiments, the present systems and methods may monitor and/or predict static and/or dynamic sagging tendencies of a drilling fluid and/or may screen different drilling fluid formulations. The present systems and methods may provide guidance for onsite fluid treatment of the drilling fluid. In other embodiments, the present systems and methods may improve measurement efficiency of static sagging by predicting at least one sagging tendency via at least one correlation established between one or more rheological properties of at least one fluid. In embodiments, the one or more rheological properties may be identified or determined after hot-roll and/or by density measurements after an aging time period.

In one or more embodiments, the at least one fluid may be, for example, at least one non-aqueous drilling fluid and/or the time period may be, for example, about a 3-day aging time period, less than about a 3-day aging time period, more than about a 3-day aging time period, about a 7-day aging time period, less than about a 7-day aging time period and/or more than about a 7-day aging time period. As a result, the present systems and methods may, by utilizing the at least established one correlation, predict at least one sagging behavior of the at least one fluid within less than about one hour of test time commencement. As a further result, one or more new mud systems may be produced, developed, and/or optimized much faster because of the decreased test time and/or may reduce a number of necessary tests for the one or more new mud systems. In an embodiment, at least one sagging behavior of the at least one fluid may be predicted within, for example, less than about 0.5 hour of test time instead of the traditional longer test times of, for example, about 168 hours.

Currently, fluid design and validation may be some of the most time-consuming and labor-intensive steps. A reduced product development resource requirement, accelerated time to market and technical leadership/improved service quality may be one or more key business drivers. The present systems and methods may improve correlation between at least one rheological parameter and sagging in a process of workflows to predict at least one of static and dynamic sagging tendency of the at least one fluid, such as, for example, a drilling mud and/or fluid (hereinafter "drilling fluid"). Additionally, the present systems and methods may allow for fast screening and/or testing of one or more different drilling fluid formulations. The present systems and methods may lessen the highly labor-intensive formulation optimization work related to static sag and/or may help or aid with "real time" decision making for drilling fluid treatment at, for example, the wellsite. The at least one rheological parameter may include, but may not be limited to, flow point, particle size and/or one or more rheological parameter. In an embodiment, the flow point may be or refer to at least one viscoelastic stress at crossover of G' and G".

In some embodiments, the present systems and methods may correlate sag with the at least one rheological parameter for drilling fluid formulation designs. Drilling fluid samples for fluid design may contain one or more additives with or at one or more different concentrations. In an embodiment, the one or more additives may include, at least one emulsifier, at least one rheology modifier, at least one wetting agent and/or one or more drilling mud additives. The present systems and methods may measure one or more rheological parameters after hot-rolled but before static aging samples by amplitude oscillation. In an embodiment, the present systems and methods may then correlate the measured parameters to 3 and/or 7 days static aging results.

In one or more embodiments, the present systems and methods may monitor and/or predict sag tendency for a fluid, such as, for example, a drilling fluid within, for example, a borehole. The present systems and methods may make, determine and/or provide guidance for onsite fluid treatment. During operation, the drilling fluid sample may be constantly sampled, and may be tested with rheometer on site to produce test samples. The test samples may be collected at a location where the drilling fluid may enter and/or may come out of the borehole or wellbore. In embodiments, the samples may be measured to obtain, collect and/or determine one or more measurements to control and/or monitor the drilling fluid properties while drilling. In an embodiment, the one or more measurements may include at least one selected from density, flow, pH and/or other sample measurements. At least flow point data collected from the one or more measurements may be sent to a workstation, such as, for example, a surface logging computer to track at least one real-time trend for the at least one flow point. One or more applications may be implemented with the collected flow point data. A first application may compare the on-site data to a pre-established database. As a result, a flow point database may be created at the laboratory, at two or more various temperatures and/or pressures for at least one specific drilling fluid, correlated to at least one sag tendency. A second application may track at least one behavior of one or more flow point changes and/or may correlate it to one or more potential incidents during one or more drilling operations since the flow point may be a more sensitive parameter than other measurements at the rig site that may be currently being measured. The one or more incidents that may be correlated to the flow point change database may be gradually built from the field. By comparing the measurements done at the rig site to said database, the present systems and methods may allow one or more mud engineers to be informed of one or more risks of sag phenomenon. As a result, the present systems and methods may help mud engineers take at least one corrective action that may include changing at least one dose of at least one additive to, for example, change circulation speed or the like without waiting for an actual sag incident to happen. In embodiments, the at least one additive may include a wetting agent, a weighting agent and/or the like.

For most of extended reach drilling practice, at least one non-aqueous drilling fluid may be widely utilized due to advantages over water-based fluids, such as, for example, high lubricity, stability at elevated temperatures and reusability. In one or more embodiments, the at least one non-aqueous drilling fluid may be an invert emulsion fluid (hereinafter "IEF") system. For example, an IEF system may have at least one oil or synthetic base fluid as the continuous (or external) phase and at least one brine as the non-continuous (or internal) phase. The continuous phase may comprise at least one viscosifier, such as, for example, organophilic clay and/or polymer, and one or more oil-wet solids, such as, for example, at least one weighting agent, at least one fluid loss control and/or one or more drilling cuts, with one or more wetting agents. An internal phase may comprise brine droplets stabilized by at least one emulsifier. Lime may be added to neutralize one or more acid gas and/or provide calcium source to activate at least one fatty-acid based emulsifier. Each component in the IEF formulation may be used for one or more specific purposes to ensure at least one product performance of the IEF system. To design a new generation of IEF drilling mud, at least two steps may need to be followed. Mud engineers first may finalize the one or more ingredients for the IEF formulation; then the concentration of each ingredient may be defined based on one or more specific field operation requirements. However, the formulated IEF system may contains up to ten or more ingredients to achieve and/or provide a good or efficient formulation that fulfill specific requirements regarding to one or more basic fluid properties, such as, for example, rheology, electrical stability, fluid loss, sagging and/or the like. The mud engineers may conduct the tests with up to one hundred or more different formulations to identify a good or efficient formulation. Among all the conducted tests, static sagging may be the most time-consuming test. With conventional aging test, since no reliable tool to predict the sag behavior is traditionally available, one iteration of the conventional aging test may take up to about 7 days or more. As a result said conventional aging test may severely prolong the formulation process.

The present systems and methods improve the measurement efficiency of static sagging by predicting sagging tendency via the at least one correlation that may be established between the one or more rheological properties of IEF after hot-roll and density measurement after about 7-day aging. In an embodiment, the present systems and methods may allow for more or improved rapid decision making during at least one step of formulation development without waiting for about 7 days and/or may reduce a chemical footprint by at least about three times less than the original volume.

Figure 2:
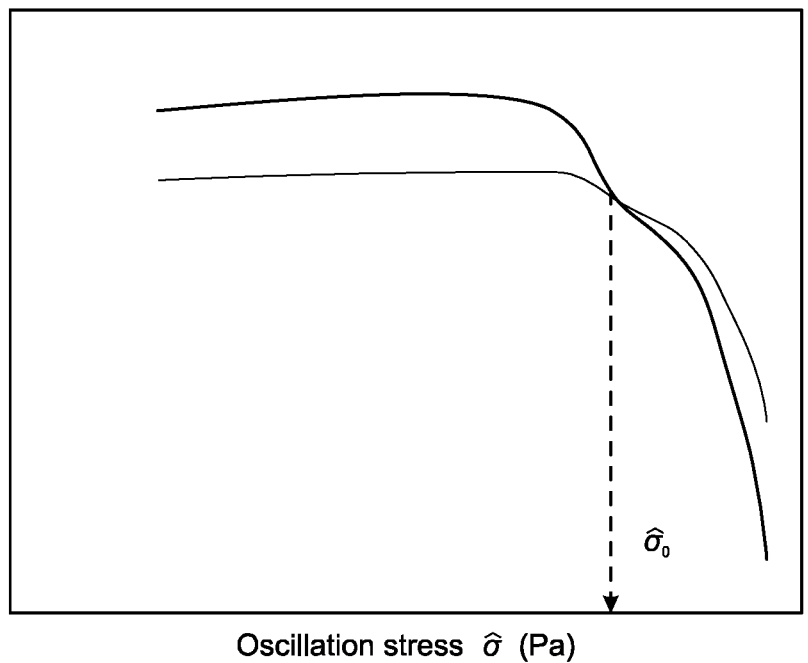
FIG. 2 is a graphic illustration of a flow point measurement by oscillatory amplitude sweep, according to one or more examples of the disclosure.
Figure 3A:
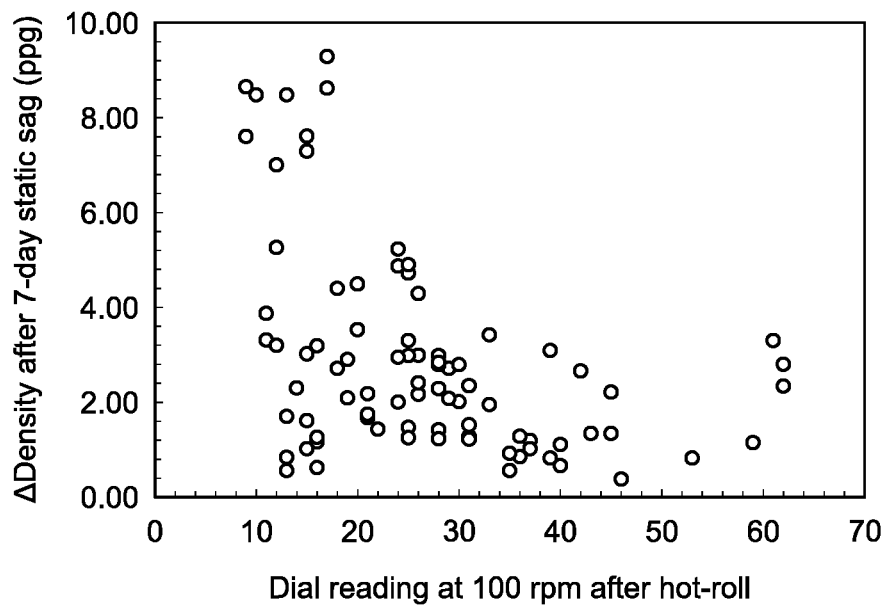
Figure 3B:
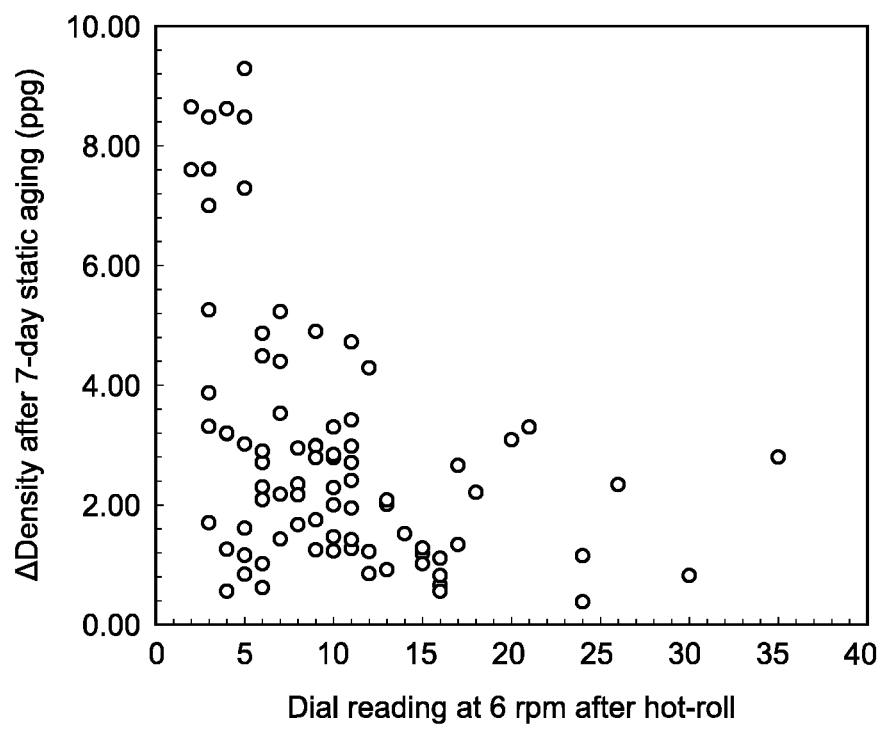
Figure 3C:
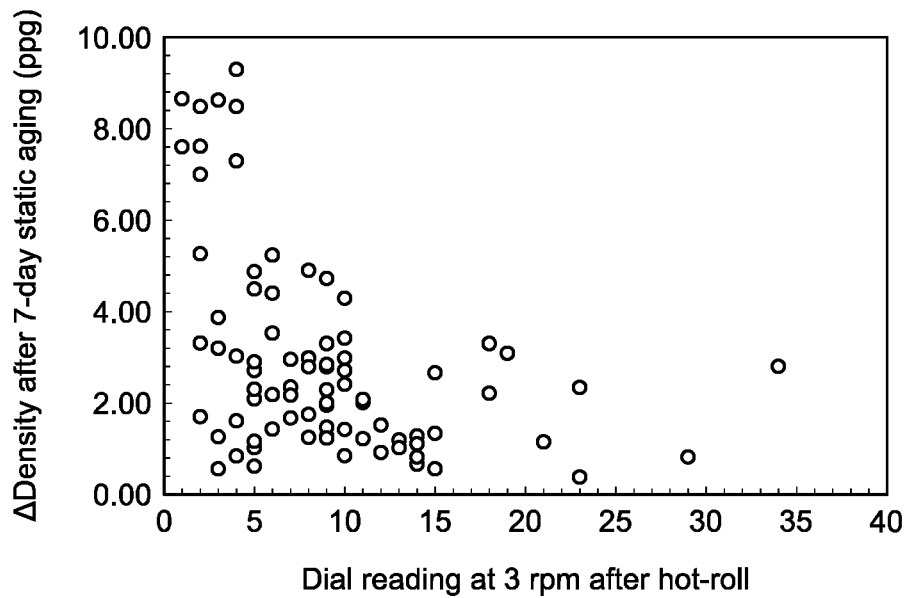
Figure 3D:
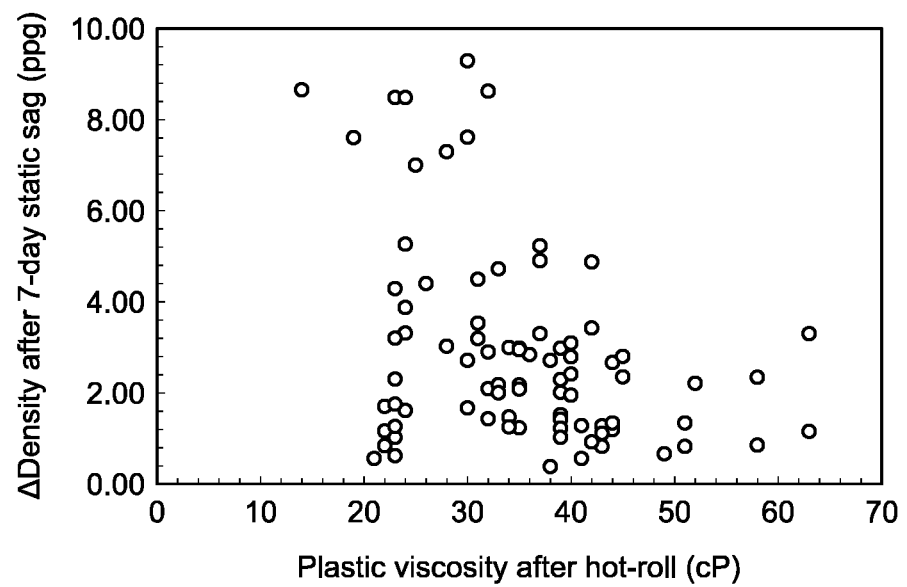
Figure 3F:
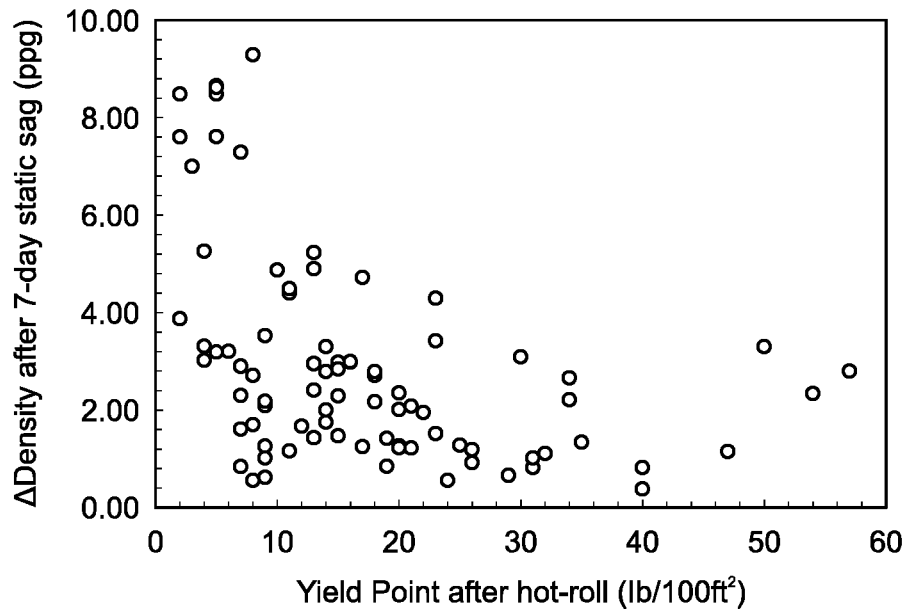
Figure 3G:
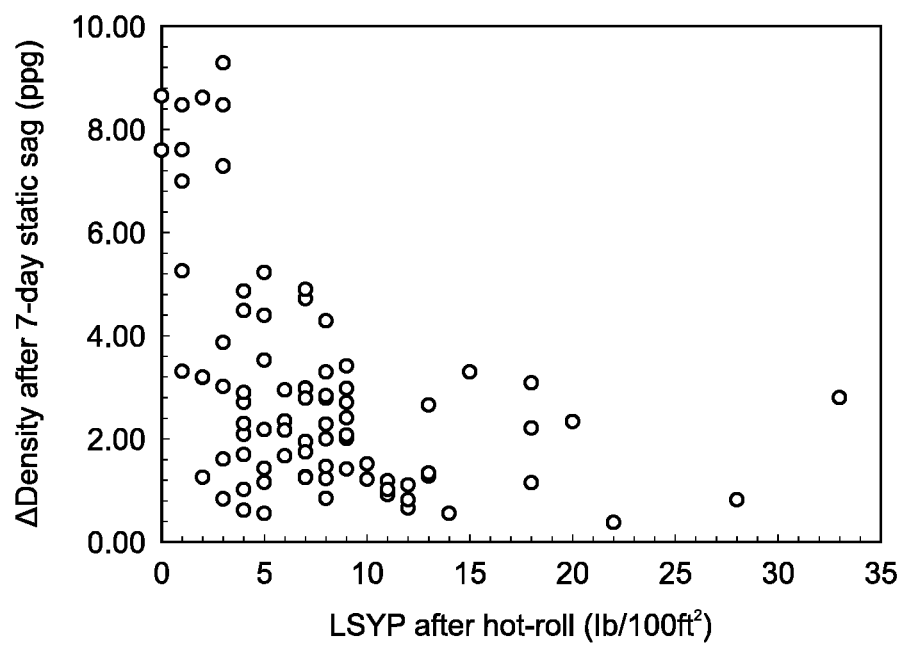
Figure 3H:
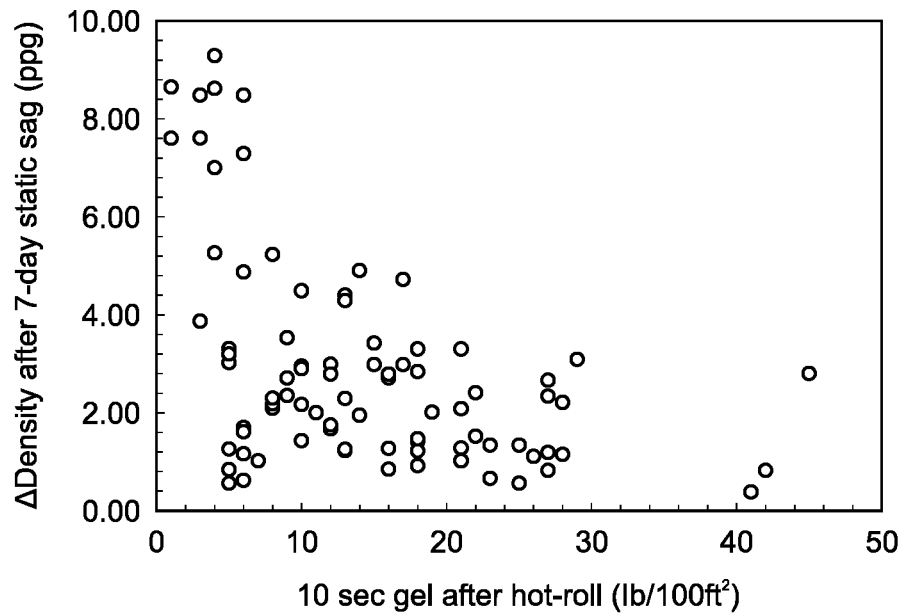
Figure 3I:
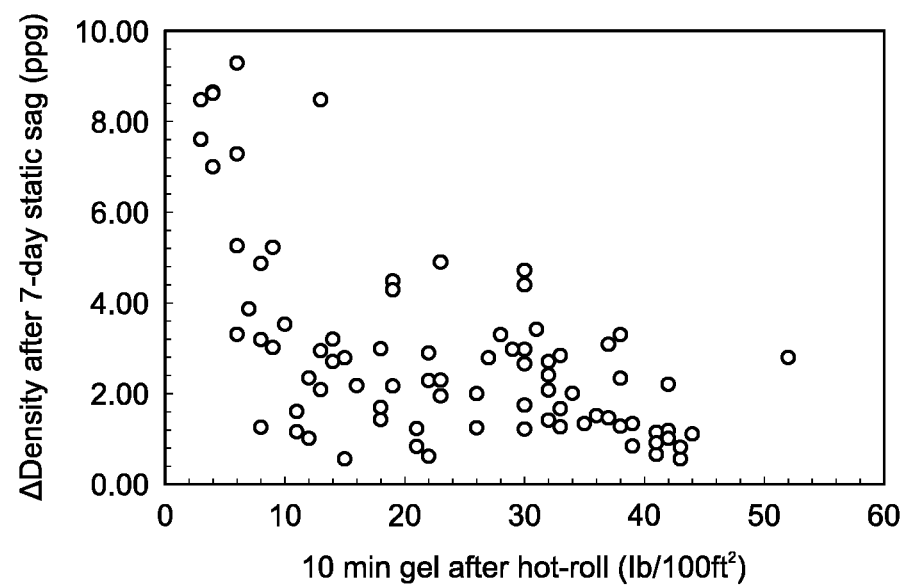

It is estimated that during static sag for an acceptable drilling fluid, the shear rate caused by barite particles may be in the orders of about 0.01 $s^{-1}$ or less. These orders may be very challenging for any rheometer to achieve. High end rheometer, such as, for example, a TA rheometer may achieve this level of accuracy once meticulous cares are given (as shown in FIG. 1). Low shear viscosity at this range is basically unachievable for viscometers like Fann 35 viscometer, whose lowest shear rate is only about 5.1 $s^{-1}$. In addition, the drilling fluid is practically at steady state during said static sag behavior, where the environment may be at equilibrium. This environment would be very difficult for any flow curve measurement, i.e., stress vs. shear measurement, to be maintained since this measurement is to apply continuous stress which may move the environment away from said equilibrium. Oscillatory measurement applied in this study may greatly preserve the pseudo equilibrium environment and/or may provide minimum perturbation to the drilling fluid system. Therefore, it is expected to achieve or obtain more realistic measurements of the drilling fluid system with the oscillatory rheology and/or amplitude oscillation. As shown in FIG. 2, the initiation of flow behavior is obtained from the amplitude sweep oscillatory measurement defined as the cross-over point of shear stress. The one or more flow points are successfully correlated to the static sag behavior as demonstrated in the examples set forth below.

After at least one sagging rate may be correlated with at least one flow point, the present systems and methods may allow one to predict the at least one sag tendency directly, or substantially directly, from the at least one rheological parameter of a before aged mud sample with no need for a lengthy static aging test. For laboratory fluid optimization, the present systems and methods may make the process more efficient and/or may reduce a workload by only trial and error. More importantly, for field application, mud engineers may identify the at least one risk of the at least one sagging occurrence at wellsite more quickly by the at least one rheological parameter without requiring one or more tedious lab tests. The present systems and methods may allow the engineers to make at least one intermediate adjustment during at least one drilling operation to prevent at least one uncontrolled situation and/or to reduce non-productive time and/or cost.

EXAMPLES

Example 1: No Correlation Between Fann 35 Viscometer and 7-Day Static Sag

A group of 80+ formulations were evaluated to probe the correlation between Fann35 measured rheology and 7-day static sag measurements. These fluids are all Rheliant Plus type of formulations (with IO 1618, 25% $CaCl_2$ brine, TOFA amidoamine emulsifier, organoclay components). Most of them have acceptable drilling fluid performances. The 7-day static sag measurements were done at 210° F. The rheology data (measured at 150° F. with Fann 35 viscometer) and static sag results were treated with a statistical approach to see if any rheology property showed, exhibited, or achieved a prominent correlation. As shown in FIGS. 3A-3I, at very high readings of each property, most of the sag values seem to be sufficient and/or ok (although still with one or more some exceptions). When the rheology value is low, it appeared that under similar rheology value that there is a huge or substantial variation of static sag result, regardless of which property was examined. As a result, any direct correlation between the measured rheology and static sag measurements was not found or identifiable.

Example 2: Correlation Between Flow Point and 7-Day Static Sag

Six fluids with different composition of wetting agent, suspension agent were prepared to evaluate the main contributor for static sag. To make a fair and relevant comparison, mud or fluid density is fixed at 14.0 ppg, water/oil volume ratio is set at 75/25. The rest of the fluid components is also kept constant. Drilling fluid compositions and concentration ranges of the selected fluids are shown below in Table 1 and details for each drilling fluid compositions are listed below in Table 2.

TABLE 1 drilling fluid compositions having different concentration ranges.

| Composition | g/350 ml |
| --- | --- |
| Base oil | As needed for OWR |
| Emulsifier | 16 |
| Alkalinity source | 4 |
| Filtration control agent | 1 |
| Internal phase (Brine) | As needed for OWR |
| Wetting agent 1 | 2-6 |
| Wetting agent 2 | 0-2 |
| Organophilic clay | 0.5 |
| Suspension agent | 8-10 |
| Rheology modifier | 1 |
| Weighting agent | As needed for mud weight |

TABLE 2 drilling fluid compositions having different sample IDs.

| Sample ID | Wetting agent 1 | Wetting agent 2 | Suspension agent |
| --- | --- | --- | --- |
| W1_2 | 2 | 0 | 8 |
| W1_4 | 4 | 0 | 8 |
| W1_6 | 6 | 0 | 8 |
| W2_0.25 | 4 | 0.25 | 8 |
| W2_2 | 4 | 2 | 8 |
| S_10 | 4 | 0 | 10 |

Figure 4A:
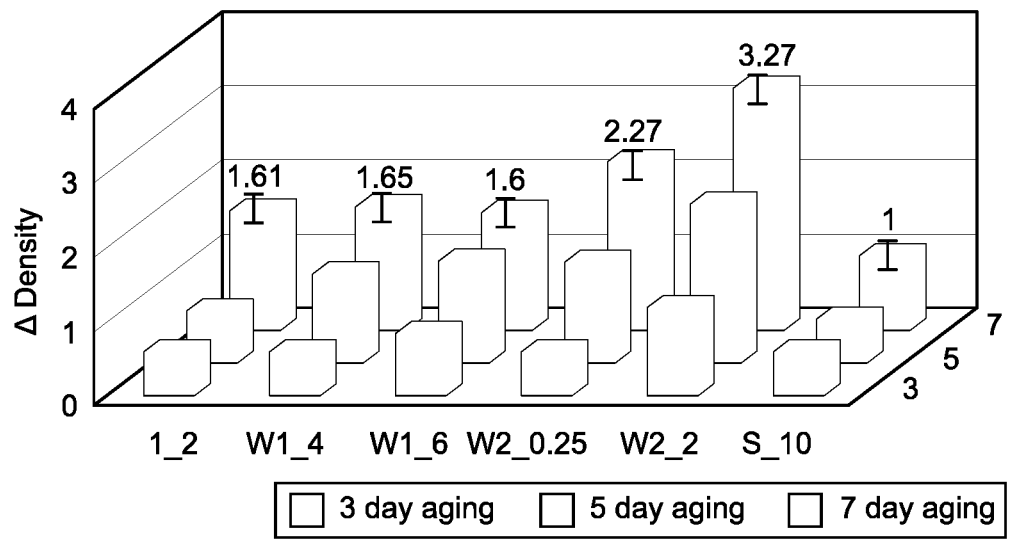
FIGS. 4A and 4B are 3-dimensional graphs illustrating static sagging results of 3, 5, 7 days aging tests at 200° F., according to one or more examples of the disclosure.
Figure 4B:
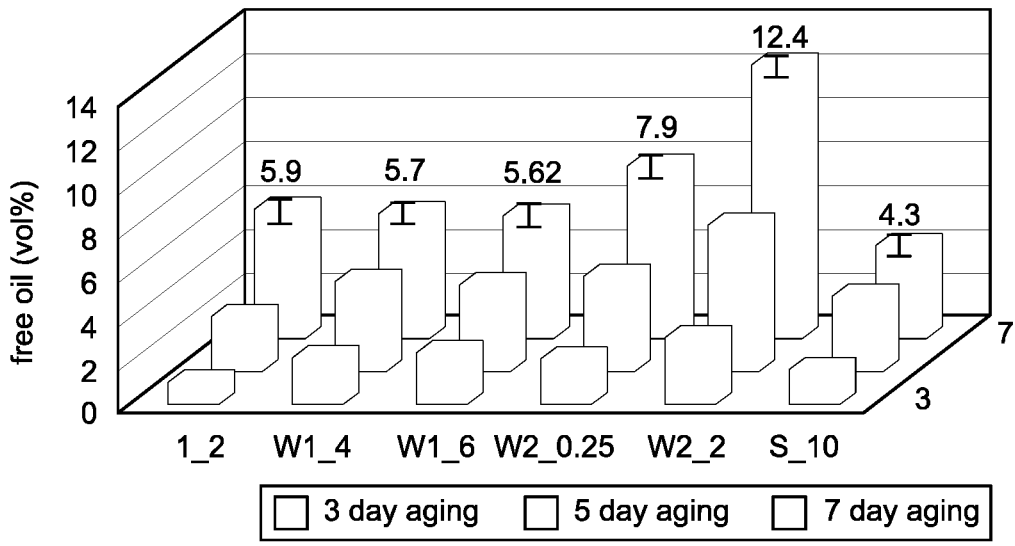
Figure 5A:
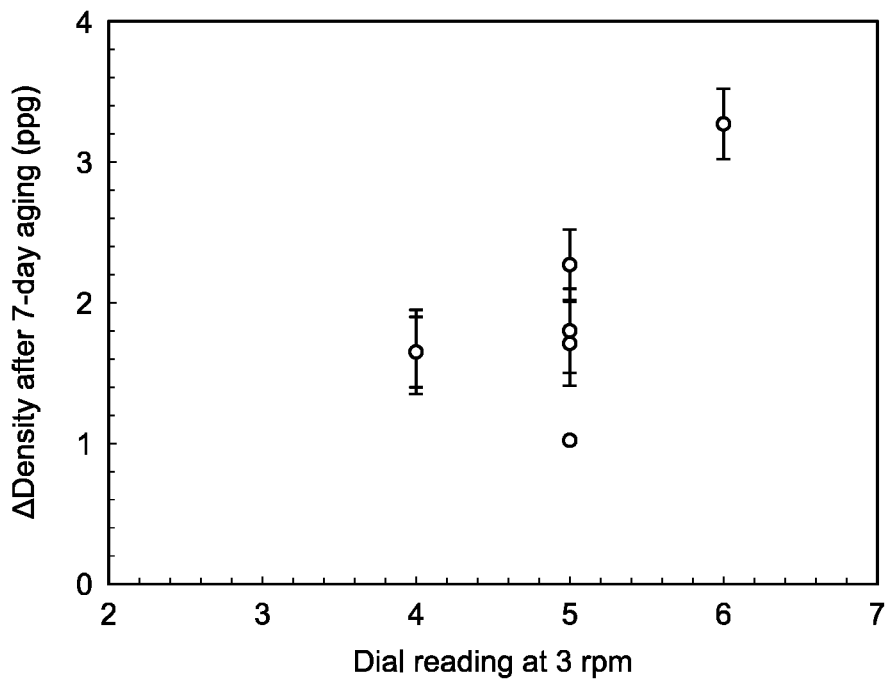
FIGS. 5A-5D are 2-dimensional graphs illustrating 7-day static sag at 200° F. verses different rheological parameters after hot-roll by a Fann 35 viscometer at 150° F., according to one or more examples of the disclosure.
Figure 5B:
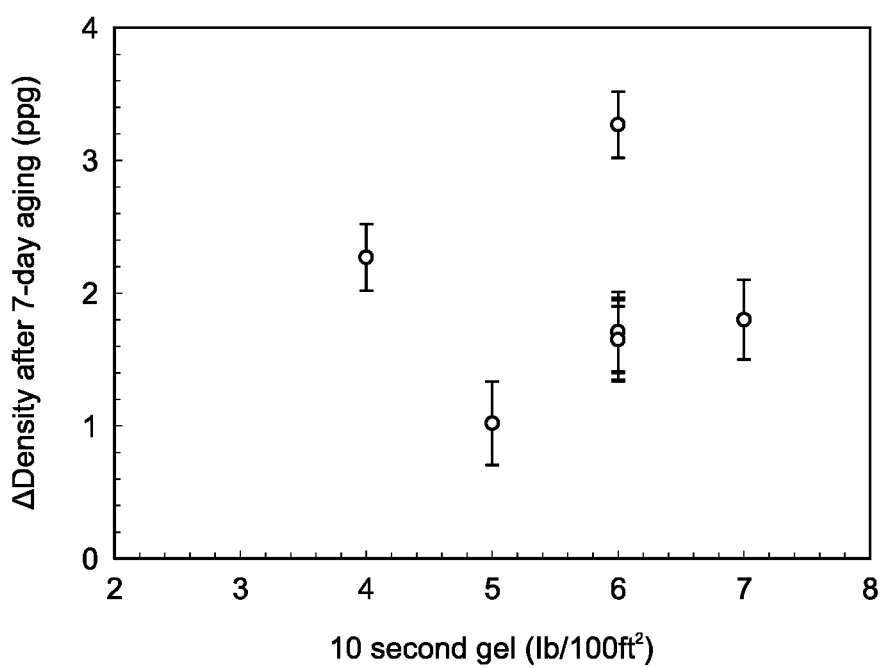
Figure 5C:
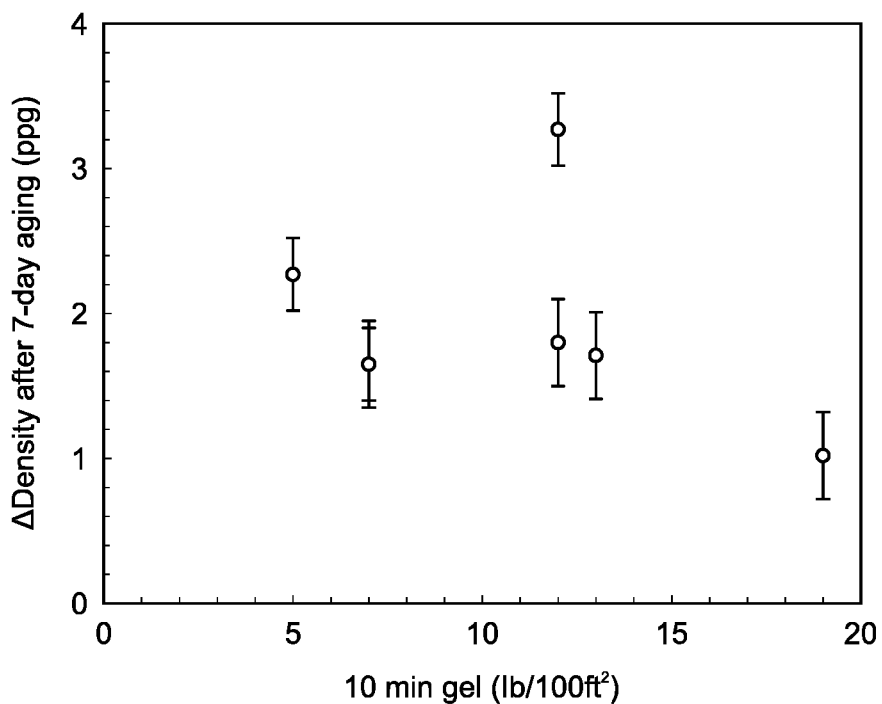
Figure 5D:
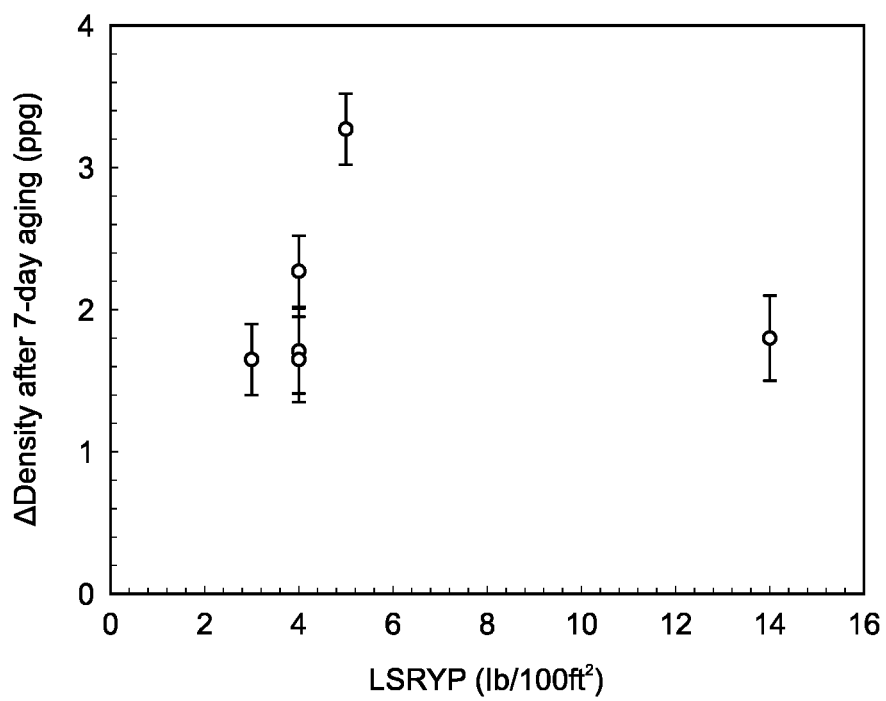

Static Sagging Results:

The static aging results are shown in FIGS. 4A and 4B. Wetting agent 1 has negligible effect on static sagging with concentration range from 2-6 gm. Wetting agent 2 has deteriorate influence on static sagging. The solid particle may be over dispersed with addition of wetting agent 2. Increase of suspension agent reduces the tendency of static sagging. The effect of different additives on free oil shows similar trend with density change.

No Correlation between Static Sag and Low Shear Rate Viscosity/Gel Strength by Fann 35 Viscometer.

Fann 35 is typical viscometer used at wellsite, and low shear rheological properties had been used by mud engineers as indirect measures of potential for static sag. Based on the experimental results with the Fann 35 viscometer, the correlation between different rheological parameters of hot-rolled sample including dial reading at low shear rate 3 rpm, low shear rate yield point (LSRYP), 10-second gel strength or 10-min gel strength and density change from 7-day static sagging measurement were investigated. For all four different rheological parameters by Fann 35 viscometer measurements, the data are too scattered to obtain any correlation with static sag (see FIGS. 5A-5D). This further validates the point that the measurement by Fann 35 viscometer is not sensitive enough to detect the true rheological properties which may influence the static sag.

Correlation of Static Sag with Ultralow Shear Rate Viscosity from Flow Curve by TA Rheometer.

To make fair comparison, the rheology measurements by TA rheometer were conducted at the same temperature as static sag. The full flow curves for 6 different fluids are presented in FIGS. 6A and 6B. The difference of viscosity among all the fluids becomes larger at low shear rate (below $10^{-2}$ $s^{-1}$). Other groups may have suggested for traditional barite field muds, sagging is correlated to ULSRV, higher viscosity leads to less sagging. At least one other group may have used viscosity at 0.5 $s^{-1}$ as sagging indicator, whereas other groups argued viscosity at $10^{-2}$~$10^{-3}$ may be more appropriate. If Stoke's law applies, ignoring particle-particle interaction and polydispersity of the particles with assumption of particle volume fraction less than 10% (single particle settling in Newtonian fluid would be valid), the corresponding shear rate for ULSRV is thought to be the shear rate created by the particle as it settles. In the present case, weighting agent particle diameter and density are about 10 µm, 4.2 $g/cm^3$ respectively, base oil density is 0.78 $g/cm^3$ and viscosity is 2 cp, low shear rate is estimated to be around $2\times10^{-5}$ $s^{-1}$. For the sample with different concentrations of wetting agent W1, W1_4 has a highest low shear viscosity of 43,940,000 cP at $2\times10^{-5}$ $s^{-1}$, almost two times than W1_6 which is 20,000,000 cP. However, according to the static sagging results in FIGS. 4A and 4B, these three samples show almost same density change over 7 days of aging. Similarly, sample S_10 with higher concentration of suspension agent than W1_4 shows better sagging results, but the viscosity for S_10 at $10^{-5}$ $s^{-1}$ is still lower than W1_4.

Figure 6A:
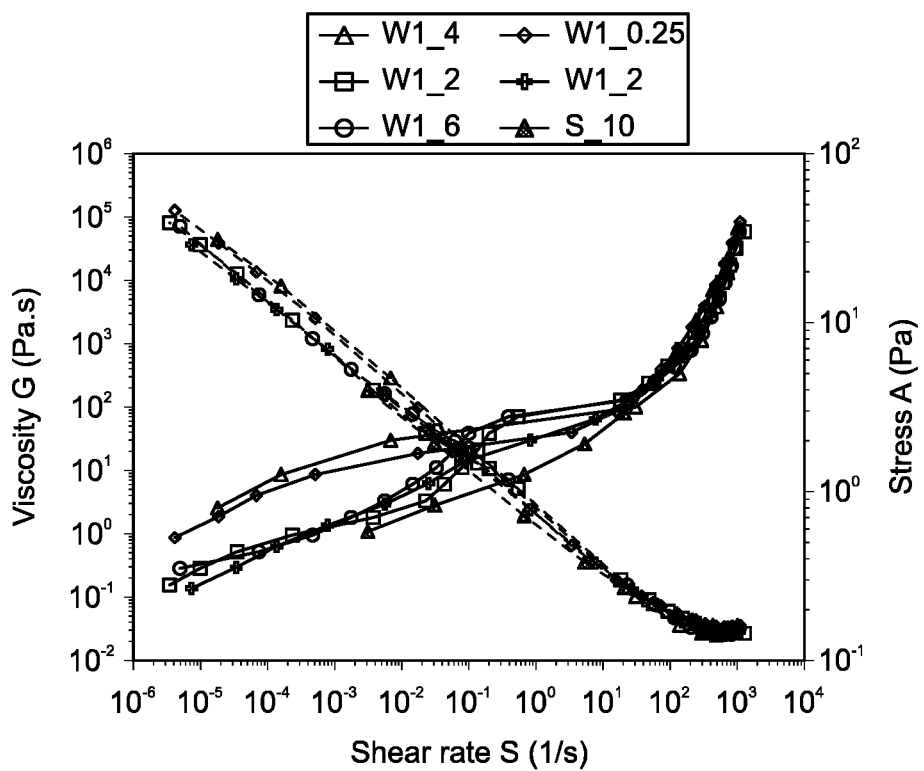
FIGS. 6A and 6B are 2-dimensional graphs illustrating (FIG. 6A) flow curves for 6 different samples after hot-roll at 200° F.
Figure 6B:
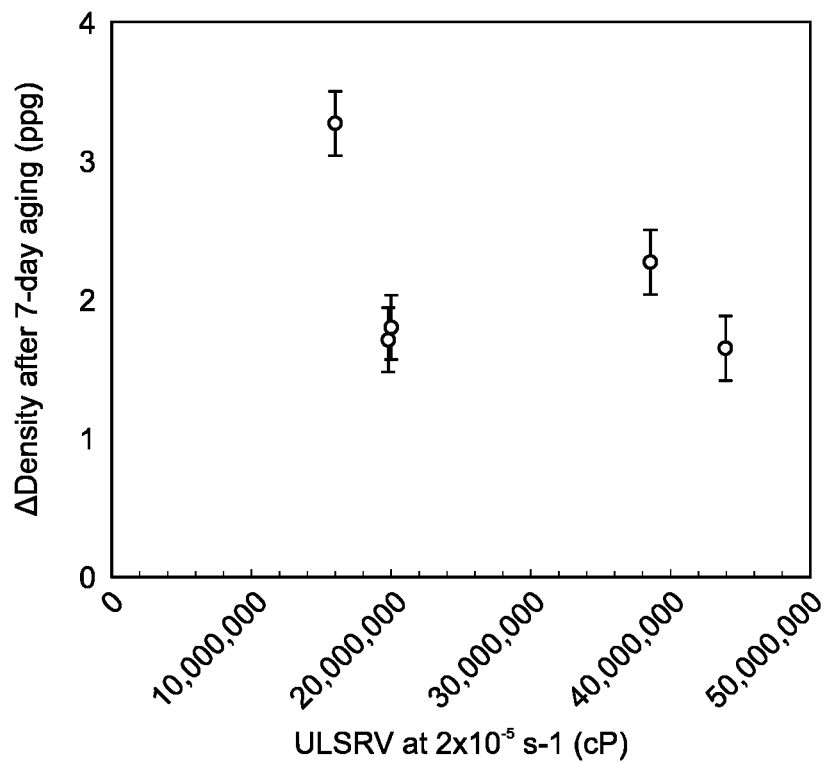
Figure 7A:
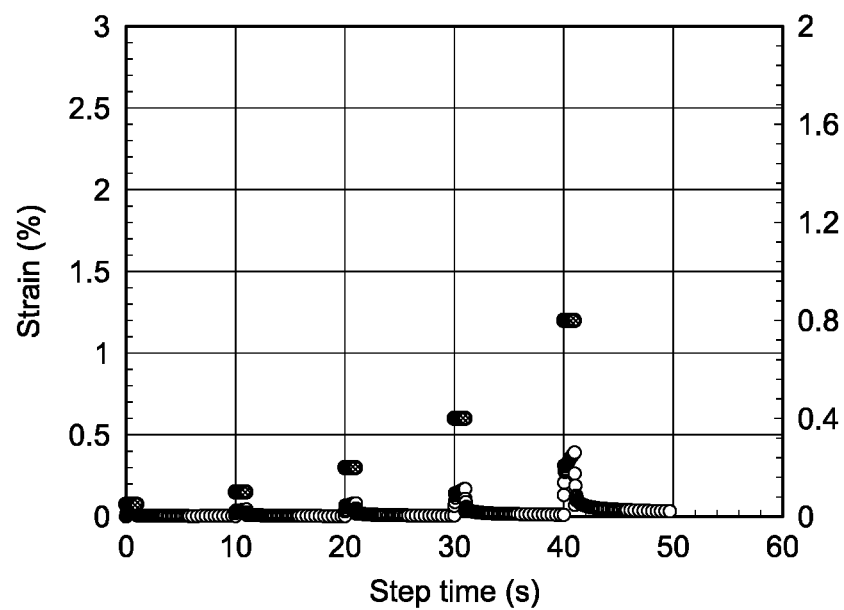
FIGS. 7A-7E are 2-dimensional graphs illustrating creep-recovery test results for different samples after hot-roll at 200° F. (uppermost dots are for applied stress, lowermost dots are for strain (%)), according to one or more examples of the disclosure.
Figure 7B:
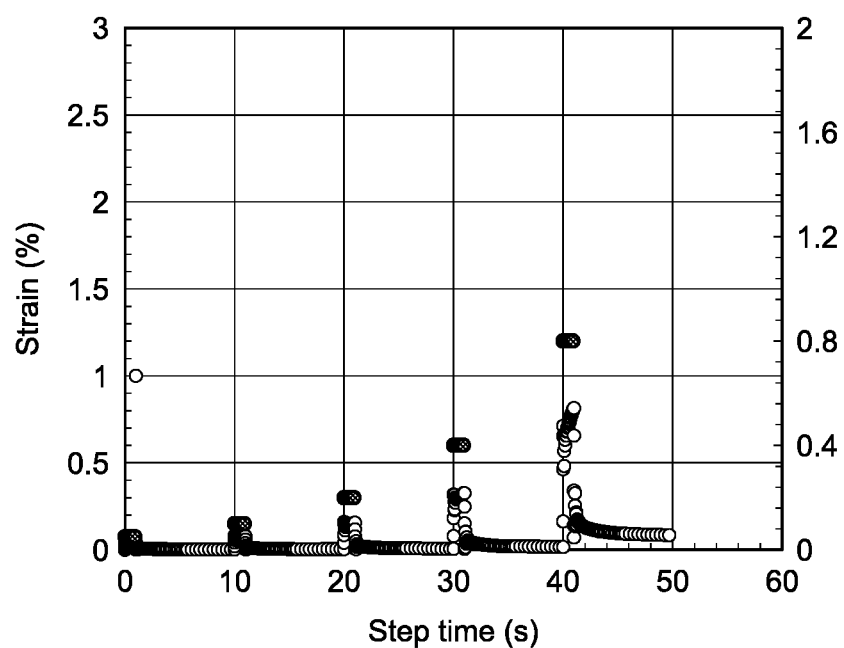
Figure 7C:
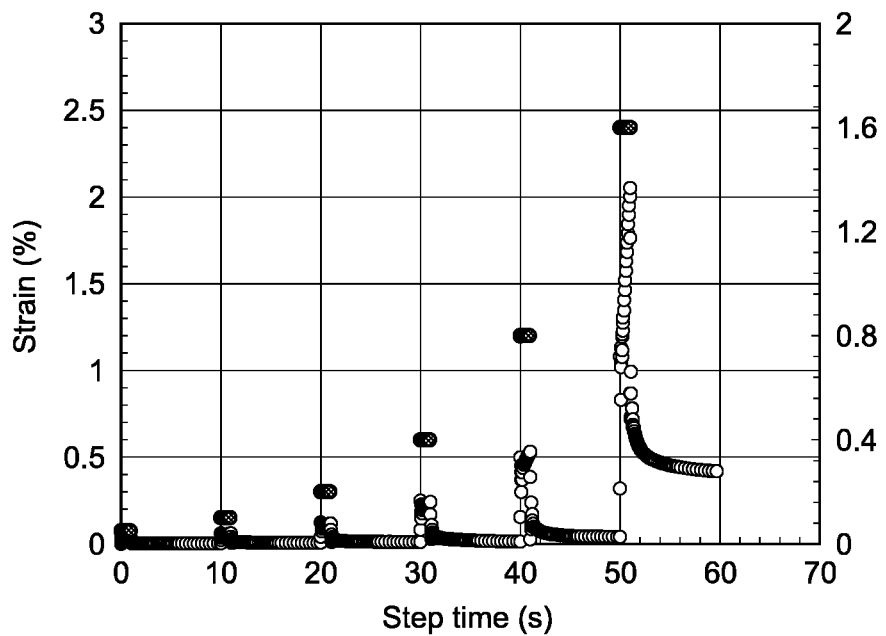
Figure 7D:
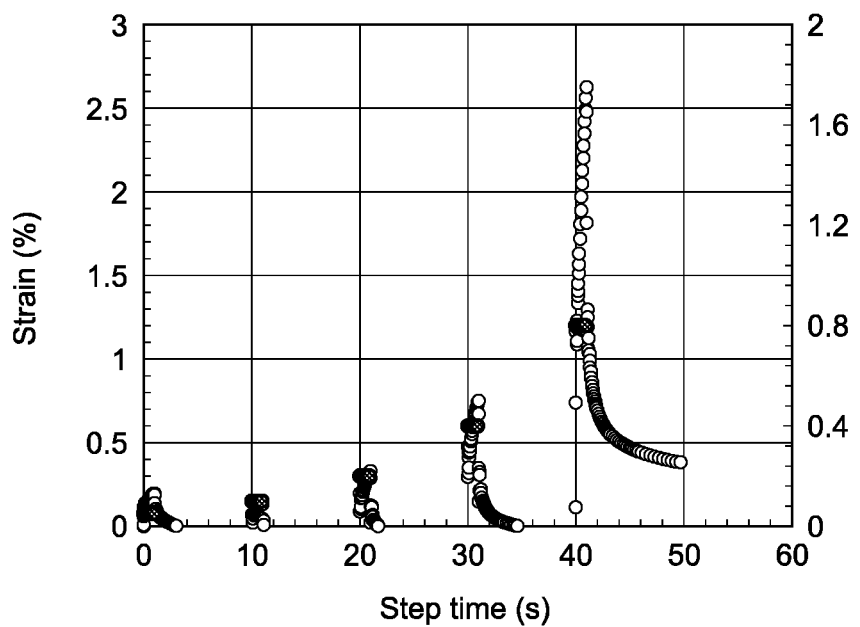
Figure 7E:
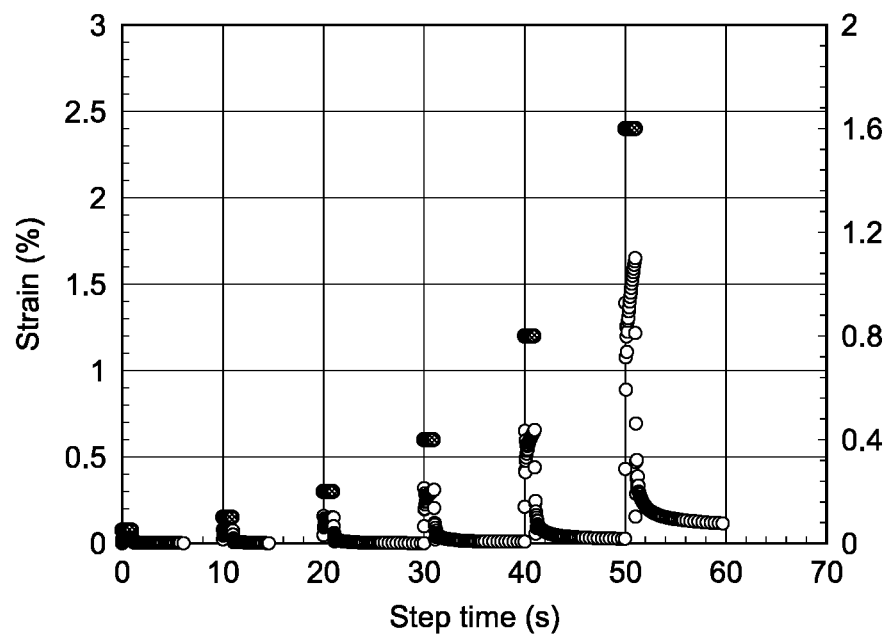

For Stoke's law, particle settling in Newtonian fluid without particle-particle interaction is first assumed, but it does not hold in reality for majority of invert emulsion fluids which contains more than 20% volume fraction of dispersed phase, particle sedimentation rate decreases exponentially with volume fraction, the shear rate of barite particles experiences may be even lower than $10^{-5}$ s$^{-1}$. Second, for constant shear measurement, the applied stress even at ultra-low shear rate may already break the microstructure formed by interparticle interactions and make it an invalid detection of the difference of true "gel structure" between samples which is important to hinder static sagging. It is thereby evidence that the well accepted low shear viscosity, even if the equipment is sensitive enough to measure it, may not give a good correlation. Last, as mentioned previously, the equilibrium environment would be very hard for any flow curve measurement to achieve, especially at ultra-low shear regime. As seen in FIG. 6A, oftentimes the shear banding effect become obvious at such low shear and reduces the accuracy of the measurement at this regime.

Correlation of Static Sagging with Creep-Recovery Test by TA Rheometer

Expect for ULSRV, "true yield stress" may be another important parameter need to be considered especially for viscoelastic system. Creep-recovery test is often used to measure the critical stress beyond which the flow is initiated. Basically, a stress is applied for a particular period of time, then is removed after some time and the recovery is monitored. In the experiment, the applied stress increases in an order of 0.05 Pa for each step (since the applied stress cannot be not too high to form permanent deformation). When the applied stress reaches the critical stress, after the strain reaches equilibrium under creep, it will partially recover upon removal of stress. This critical stress is the yield stress of the fluid. In order to precisely measure yield stress of different fluids, smaller step change in applied stress need to be taken. Based on approximate measurement of creep and recovery, as shown in FIGS. 7A-7E, samples with different wetting agent 1 have similar yield stress in the range of 0.4~0.8 Pa. W2_0.25 and S_10 show higher yield stress above 0.8 Pa. However, carrying out creep experiments and ensuring to reach an equilibrium state can be quite time consuming, it could take hours to get reliable results other than few minutes, therefore oscillation test in next section is introduced instead.

Correlation of Static Sagging with Viscoelastic Properties by Oscillation Amplitude Sweep.

Figure 8:
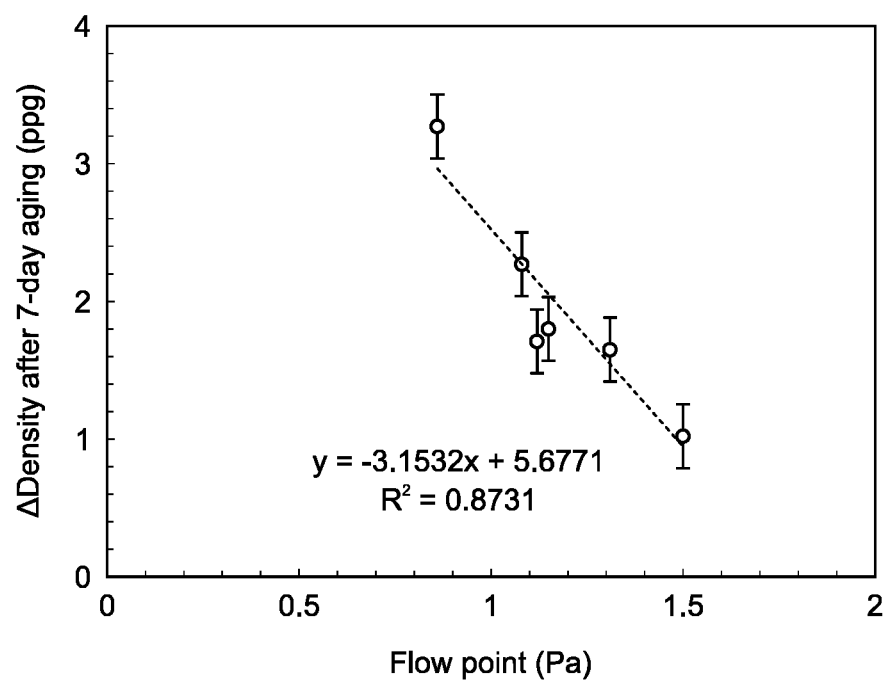
FIG. 8 is a 2-dimensional graph illustrating correlation between flow point at 1.59 Hz measured after hot-roll and density difference after 7 days static aging at 200° F., according to one or more examples of the disclosure.

Amplitude sweep where storage modulus G' and loss modulus G" is measured as a function of strain, the crossover stress between G' and G" is defined as flow point. The value of flow point is identified as the minimum stress above which the 'structure' of the emulsion starts to break down and sample change from solid-like structure towards more liquid like structure (for example, breakdown of flocs into smaller units or breakdown of a 'structuring' agent). This critical stress depends on the strength of the "flocculated structure" induced by the attractive energy between the droplets/particles. The flow points for all fluids in Example 2 at 1.59 Hz were obtained. The 7-day static sag was plotted vs. flow point $\sigma_\theta$ in FIG. 8. There is a clear trend in the variation of flow point at 1.59 Hz corresponding to static sag. Higher the flow point indicates stronger adhesive energy the particle need to overcome during settling leading to less static sag after 7-day aging. Linear curve fitting is applied to find quantitative correlation between flow point and static sag. By using this correlation, the sagging behavior of specific fluid can be predicted within less than 0.5 hour of test other than 168 hours, allowing engineers to optimize a new mud system much faster and reduce number of tests only based on trial and error. Moreover, this measurement can also be applied to monitor the quality of the drilling fluid in real time and be used to calculate a theoretical model to predict the sag behavior (or fraction of free oil generated) in static condition by well.

Example 3: Validation of Correlation Between Flow Point and Static Sag with Different Mud Densities FIG. 8 demonstrates that there is good correlation between the flow point and static sag for the fluids with same density. Here, Example 3 demonstrates that this correlation also exists at different mud densities. In this example, two sets of mud were prepared at two different densities, namely 12.99 and 14.57 ppg. The suspending agent was varied from 4 to 10 ppb within each set. Table 3 gives example formulations for these two sets of fluids.

TABLE 3

Example formulation for the 12.99 ppg and 14.6 ppg mud.

| Composition | g/350 ml |
| --- | --- |
| Base oil | As needed for OWR |
| Emulsifier | 12 |
| Alkalinity source | 5 |
| Filtration control agent 1 | 0.85 |
| Filtration control agent 2 | 0.35 |
| Internal phase (Brine) | As needed for OWR |
| Organophilic clay | 1 |
| Suspension agent | 4, 6, 8, 10 |
| Wetting agent | 4 |
| Rheology modifier | 1 |
| Weighting agent | As needed for mud weight |

The solid free liquid content after a static sag study is normally correlate to the amount of density difference between bottom and top of the mud. Hence in this example, instead of measuring the actual density differences, the free oil on top of the mud after sag test is used as the sag indicator.

Figure 9:
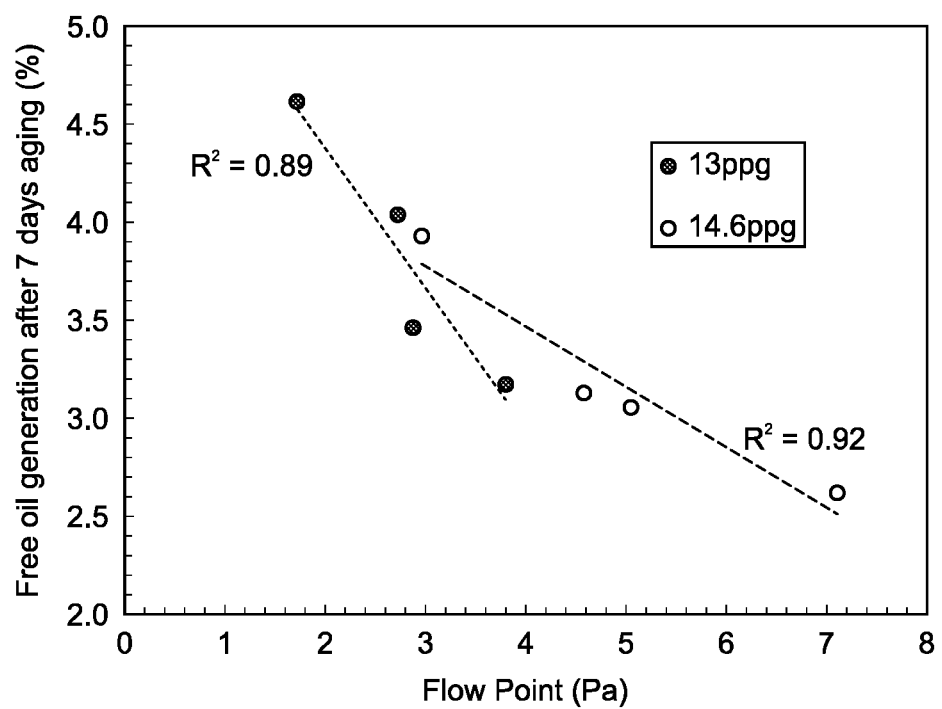
FIG. 9 is a 2-dimensional graph illustrating flow point-sag correlation for different mud densities, according to one or more examples of the disclosure.

The correlations of these two different mud series are plotted in FIG. 9. As shown in the plot, the two density fluids each follows its own correlation, fluid more sensitive flow point value with lower density. As mentioned before, this can be expected with the different internal phase solid volume fraction. As the density increases, the solid volume fraction increases, interaction factor among particles increases. This led to higher rheology due to jamming effect and render the sag into hindered settling region which is less dependent on the rheology but more on the solid volume fraction.

The presently disclosed systems and methods are configured and/or adapted for monitoring and/or predicting one or more sagging tendencies of fluids and/or for screening one or more different fluid formulations. Additionally, the present systems and methods may comprise a novel and inventive rheology system and method for monitoring and predicting barite sagging in at least one fluid, such as, for example, offshore drilling fluids and the like.

New Drilling Mud Challenges—Offshore

For offshore drilling, a lot of drilling activities are now targeting to go deeper water further offshore to increase the contact with the reservoir and maximize the production, the drilling engineers oftentimes must deal with highly deviated wells, with longer tripping distance, mud is much less frequently sheared, and the fluid is left in prolonged static condition. In this case, fluid stability becomes a concern. Under static condition, heavier particles tend to settle at the lower part of the wellbore, which is referred to as "static sag phenomenon". If static sag is not well controlled during operation, then incidents like pipe stuck or other well control problem may occur during the process.

Limitations of Static Sag Detection

For mud formulation design, engineers follow a sequence of test steps. If, any step goes wrong, engineers must start from basic property test with new formulation. The whole process is iterative. During the formulation cycle, static sag is the most time-consuming step, because engineers need to wait for 7 days to get the results. Because of the complexity of the present current drilling fluid system (containing over 10 different additives), engineers usually need to do more than 100 times of iteration to get the right formulation, this would significantly prolong the formulation cycle-time. A step change for static sag is required.

Instrument Selection

It is estimated that during static sag for an acceptable mud, the shear rate of what barite particles experiences is in the orders of 0.01 $s^{-1}$ or less. This would be very challenge for any rheometer. To better improve fluid properties to prevent sag, a better understanding of fluid rheology at such low shear condition may be necessary. Potential instruments for this study include a Rheolaser, a Fann 35 viscometer, a Grace 5600 viscometer, a Brookfield viscometer, and a TA-DHR3 rheometer.

For Rheolaser, sample can be tested in the same condition as static sag. Particle motion is detected by intensity change of scattered light. But this method is only applicable for low turbidity fluid, which is not the case for mud.

Fann 35 viscometer has a low-shear-rate restriction of 5.1 $s^{-1}$. Low shear viscosity at this range is unachievable for viscometers, like the Fann 35. Even other advanced viscometer such as the Brookfield or the Grace viscometer is designed to have lower shear range capability, the accuracy under such low shear rate is not guaranteed.

High end rheometer, such as, the TA rheometer may get to this level of accuracy once meticulous cares are given. It allows to measure ultra-low shear rate viscosity as well as detect strength of fluid microstructure by oscillation test, which could preserve the pseudo equilibrium environment and provides minimum perturbation to the system.

Rheology by Fann 35 Viscometer Verses 7-Day Sag

A group of 80+ formulations were evaluated to probe the link between Fann 35 viscometer measured rheology and 7-day static sag measurements. These fluids are all synthetic oil based mud (with IO 1618, 25% CaCl2 brine, TOFA amidoamine emulsifier, organoclay components). Most of them have acceptable drilling fluid performances. The 7-day static sag were done at 210° F. The rheology data (measured at 150° F. with Fann35 viscometer) and static sag results were treated with a statistical approach to find any prominent correlation.

When the rheology value is low, it appears that under similar rheology value, there is a huge variation of static sag result, regardless which property looked at. Any direct correlation between the measured rheology and static sag could not be found.

The fluid is "almost" at steady state when static sag occurs, where the environment is at equilibrium. This environment would be very difficult for any flow curve measurement, i.e. stress vs. shear measurement, since this measurement is to apply continuous stress which will get the environment away from equilibrium.

Oscillation Test by TA-DHR 3 Rheometer

The initiation of flow behavior is obtained from the amplitude sweep oscillatory measurement defined as the cross-over point of shear stress. The flow points are successfully correlated to the static sag behavior as demonstrated in above-identified Examples 1 and 3 discussed herein.

For Example 1, six fluids with different composition of wetting agent, suspension agent are prepared. To make a fair comparison, mud density is fixed at 14.0 ppg, oil/water volume ratio is set at 75/25, other additives ranges are in table below. In Example 3, two sets of mud were prepared at two different densities, 12.99 and 14.6 ppg. Only the suspending agent was varied within each set.

Flow Point—Sag Correlation Examples

In Example 1, the value of flow point is identified as the minimum stress above which the 'structure' of the emulsion starts to break down and sample change from solid-like structure towards more liquid-like structure (for example, breakdown of flocs into smaller units or breakdown of a 'structuring' agent). This critical stress depends on the strength of the "flocculated structure" induced by the attractive energy between the droplets/particles. The 7-day static sag vs. flow point was plotted. There is a clear trend in the variation of flow point at 1.59 Hz vs. static sag. Higher flow point, indicates stronger adhesive energy the particles need to overcome during settling, leading to less static sag in 7-day aging. Linear curve fitting is applied to quantitative predict static sag based on flow point values.

In Example 3, the correlations of two different density mud series are plotted. As shown in the plot, each of the two fluids follows its own correlation, fluid is more sensitive to flow point value with lower density.

At least the following conclusions may be made from Examples 1 and 3: static sag of oil-base-mud is linked to fluid flow point rheology; and sagging behavior of specific fluid can be predicted with less than 0.5 hour of experiments verses the actual 168 hour test. This allows engineers to optimize a new mud system much faster and at least one prediction may be usable on the rig site on existing mud to predict if static sag would be an issue should the well be in shut-in status due to situations, like, a hurricane. Based on at least one prediction, a mud engineer may adjust the fluid system quickly based on the flow point measurement.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A method comprising:
   circulating a drilling fluid in a wellbore;
   measuring at least one viscoelastic property of the drilling fluid by oscillatory amplitude sweep, wherein the measured at least one viscoelastic property of the drilling fluid comprises at least one flow point value defined as a crossover stress between storage modulus G' and loss modulus G";
   establishing, by application of linear curve fitting, at least one quantitative correlation between at least one static sagging rate and the measured at least one viscoelastic property of the drilling fluid; and
   utilizing the established at least one correlation to predict at least one static sagging tendency of the drilling fluid.

2. The method of claim 1, wherein the at least one static sagging tendency of the drilling fluid comprises barite sagging of the drilling fluid.

3. The method of claim 2, further comprising:
monitoring the barite sagging of the drilling fluid based on the predicted at least one static sagging tendency of the drilling fluid.

4. The method of claim 1, further comprising:
preventing a stuck pipe in the wellbore by reducing a static sagging of the drilling fluid.

5. The method of claim 1, further comprising:
mitigating a static sagging of the drilling fluid by introducing at least one additive into the wellbore.

6. The method of claim 5, wherein the at least one additive comprises at least one emulsifier, at least one rheology modifier, at least one wetting agent, or at least one combination thereof.

* * * * *